United States Patent [19]

Matsuda et al.

[11] Patent Number: 5,621,794
[45] Date of Patent: Apr. 15, 1997

[54] MOVING-PICTURE ENCIPHERMENT METHOD AND SYSTEM, AND ENCIPHERED MOVING-PICTURE DECIPHERMENT METHOD AND SYSTEM

[75] Inventors: Masahiro Matsuda; Naoya Torii; Takayuki Hasebe; Noboru Iwayama; Masahiko Takenaka, all of Kawasaki, Japan

[73] Assignee: Fujitsu Limited, Kawasaki, Japan

[21] Appl. No.: 517,245

[22] Filed: Aug. 21, 1995

[30] Foreign Application Priority Data

Dec. 6, 1994 [JP] Japan ..................... 6-302249

[51] Int. Cl.[6] ........................... H04N 7/167
[52] U.S. Cl. ........................... 380/20; 380/9
[58] Field of Search ..................... 380/20, 9, 14, 380/5

[56] References Cited

U.S. PATENT DOCUMENTS 5,104,310 4/1992 Walker et al. .................. 380/20
5,546,461 8/1996 Ibaraki et al. .................. 380/20

FOREIGN PATENT DOCUMENTS 6-054325 2/1994 Japan.

*Primary Examiner*—David C. Cain
*Attorney, Agent, or Firm*—Staas & Halsey

[57] ABSTRACT

Moving-picture data in a frame is encoded without depending on another frame of moving-picture data, and moving-picture data in a frame is encoded depending on another frame of moving-picture data. Whether each frame of moving-picture data is a frame which was encoded without depending on another frame of moving-picture data or which was encoded depending on another frame of moving-picture data is determined. The frame of moving-picture data was thus determined as having been encoded without depending on another frame of moving-picture data. The enciphered moving-picture data includes the frame of moving-picture data and the frame of moving-picture data which was determined as being the frame which was encoded depending on another frame of moving-picture data.

32 Claims, 14 Drawing Sheets

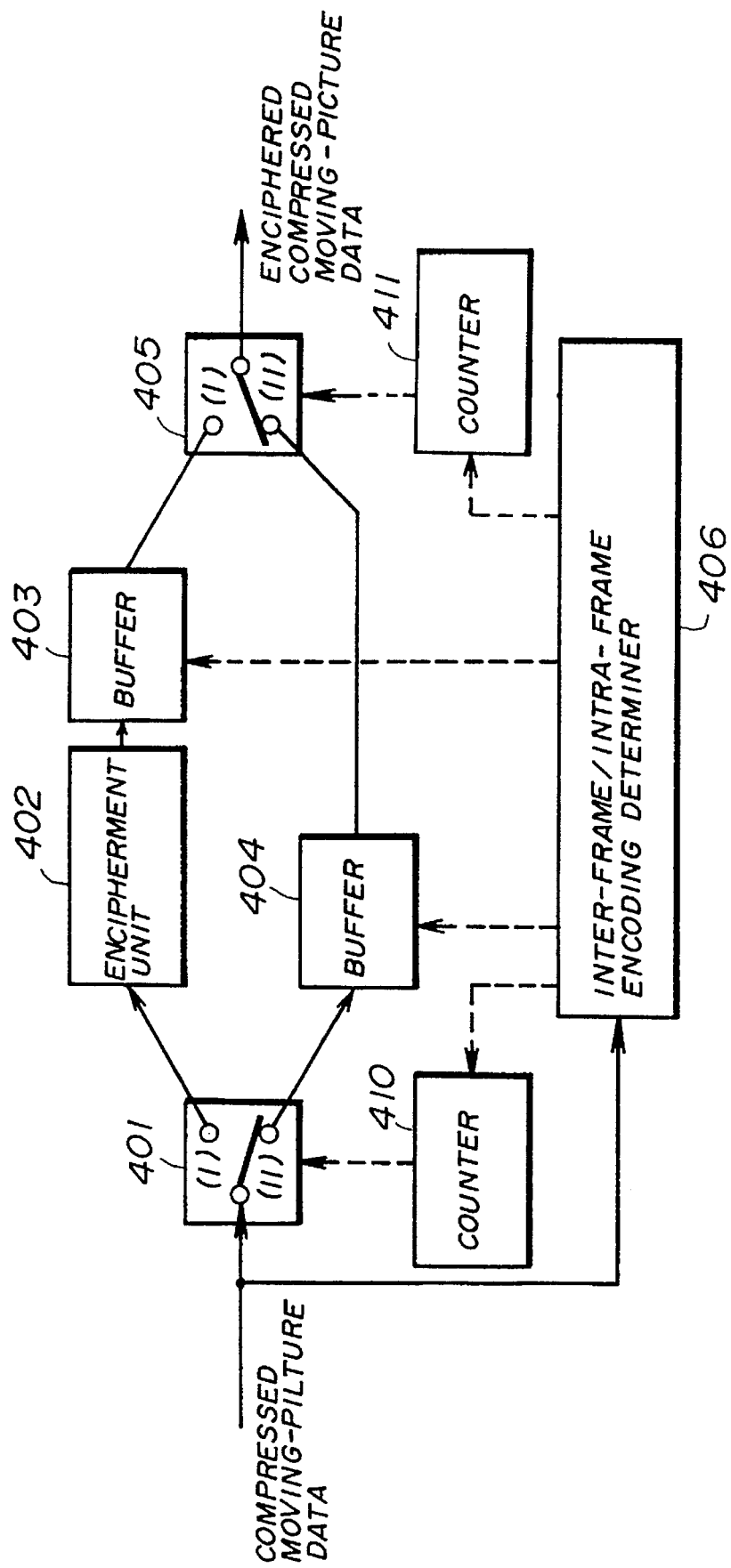

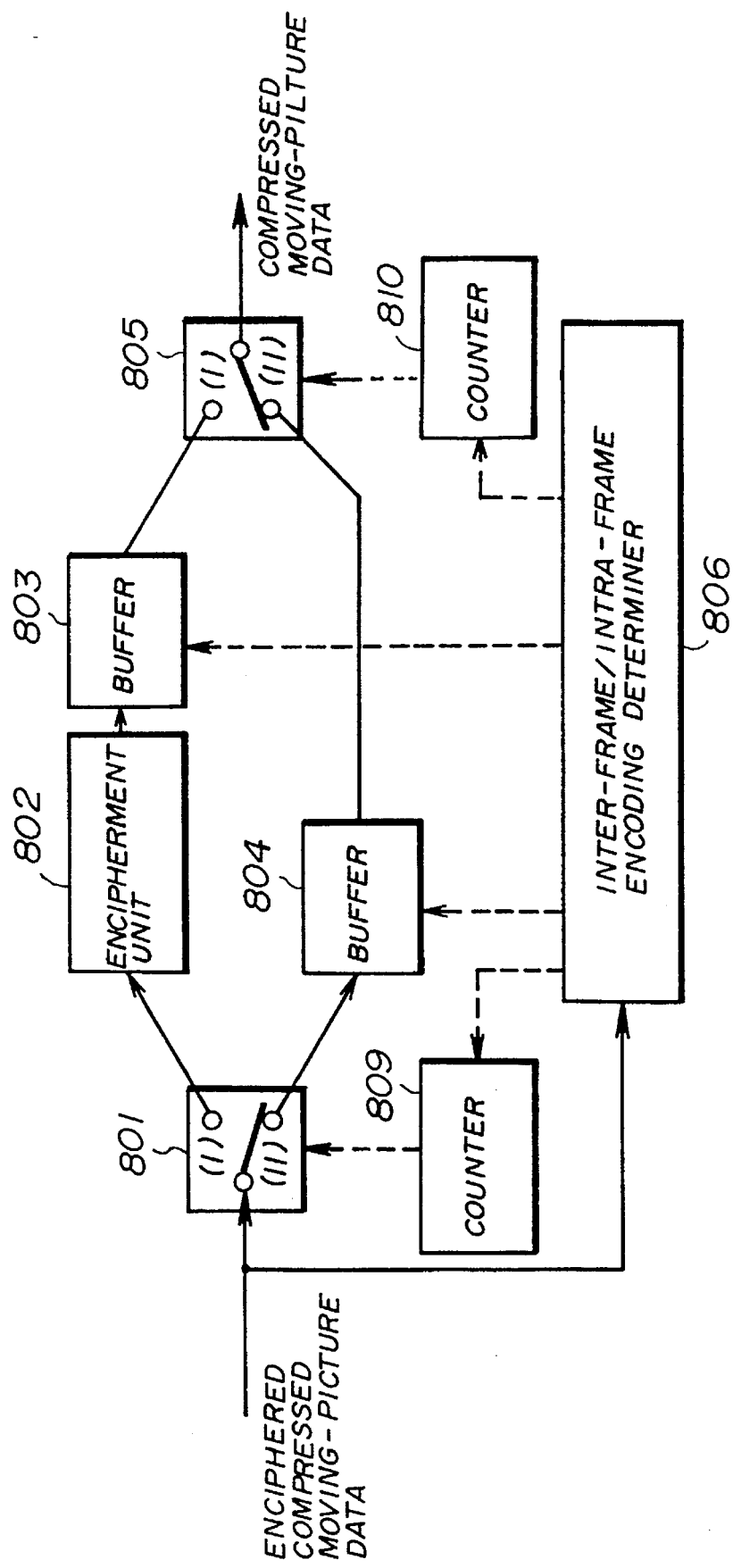

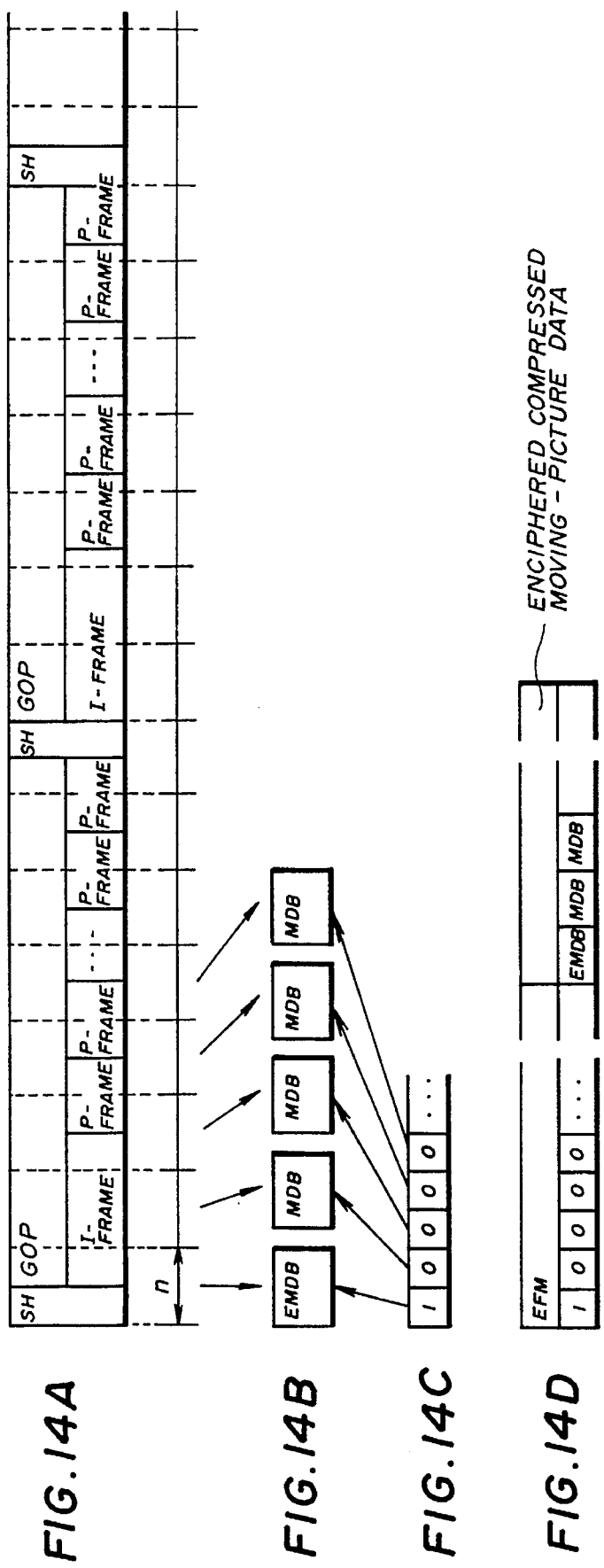

5,621,794

MOVING-PICTURE ENCIPHERMENT METHOD AND SYSTEM, AND ENCIPHERED MOVING-PICTURE DECIPHERMENT METHOD AND SYSTEM

BACKGROUND OF THE INVENTION

1. Field of the Invention

The present invention relates to a moving-picture encipherment method and system, and an enciphered moving-picture decipherment method and system. The moving-picture data processed consists of intra-frame encoded moving-picture data frames and inter-frame encoded moving-picture data frames. In detail, the present invention relates to the encipherment method and system by which highly safe encipherment of the moving-picture data can be easily achieved, and to the decipherment method and system by which the moving picture enciphered through the encipherment method can be easily deciphered.

Distribution of moving-picture data has been proposed such that moving-picture data which is recorded in a recording medium such as a CD-ROM or the like as a file is provided to a user, or moving-picture data is directly transmitted to a terminal unit of a user via a communication network. In such moving-picture data distribution, it is necessary to protect the copyright of the moving-picture data and to charge for distributing it. Therefore, it is necessary to prevent moving-pictures from unauthorized use. For this purpose, moving-picture data is enciphered.

2. Description of Related Art

In the field of broadcasting and so forth, relatively simple encipherment is performed such as scan lines being replaced. Application of such a moving-picture data enciphering method used in the broadcasting field and so forth to encipher moving-picture data handled by a computer will now be considered. If such an application is provided, moving-picture data enciphering can be relatively easily performed but deciphering of the enciphered data can also be performed relatively easily. Thus, a problem is presented as to the safety of the enciphered data.

It is possible to use a high-order encipherment algorithm such as a highly safe DES (Data Encryption Standard) or the like. However, a moving picture has a very large amount of data. Therefore, if all moving-picture data representing a moving picture is enciphered in accordance with such a highly safe encipherment algorithm, it may be difficult to perform an enciphering operation within an appropriate time.

SUMMARY OF THE INVENTION

The present invention uses characteristics of moving-picture data consisting of intra-frame encoded moving-picture data frames and inter-frame encoded moving-picture data frames. An object of the present invention is to provide an encipherment method and system by which highly safe encipherment of the moving-picture data can be easily achieved, and a decipherment method and system by which the moving picture enciphered through the encipherment method can be easily deciphered.

A moving-picture data encipherment method according to the present invention comprises steps of:

a) encoding moving-picture data in a frame, without depending on another frame of moving-picture data, namely, intra-frame encoding;

b) encoding moving-picture data in a frame, depending on another frame of moving-picture data, namely, inter-frame encoding;

c) determining whether each frame of moving-picture data is a frame which was encoded in step a) or in step b);

d) enciphering the frame of moving-picture data which was determined in step c) as being the frame encoded in step a); and e) producing enciphered moving-picture data including the frame of moving-picture data which was enciphered in step d) and the frame of moving-picture data which was determined in step c) as being the frame which was encoded in step b).

A moving-picture data encipherment system which operates in accordance with the above-described method comprises:

first encoding means for encoding moving-picture data in a frame, without depending on another frame of moving-picture data;

second encoding means for encoding moving-picture data in a frame, depending on another frame of moving-picture data;

determining means for determining whether each frame of moving-picture data is a frame which was encoded by the first encoding means or by the second encoding means;

enciphering means for enciphering the frame of moving-picture data which was determined by the determining means as being the frame encoded by the first encoding means; and outputting means for outputting enciphered moving-picture data including the frame of moving-picture data which was enciphered by the enciphering means and the frame of moving-picture data which was determined by the determining means as being the frame which was encoded by the second encoding means.

Thus, part (intra-frame encoded frames) of a plurality of frames of moving-picture data is enciphered.

A moving-picture data decipherment method, which deciphers the enciphered moving-picture data, comprises steps of:

a) determining whether each frame of enciphered moving-picture data is an intra-frame-encodeded frame having been encoded without depending on another frame of moving-picture data or an inter-frame-encoded frame having been encoded depending on another frame of moving-picture data;

b) deciphering, in accordance with an algorithm which is reverse of a relevant enciphering algorithm, the frame of moving-picture data which was determined in step a) as being the intra-frame-encoded frame; and c) producing deciphered moving-picture data including the frame of moving-picture data which was deciphered in step b) and the frame of moving-picture data which was determined in step a) as being the inter-frame-encoded frame.

A moving-picture data decipherment system, which operates in accordance with the above-described method comprises:

determining means for determining whether each frame of enciphered moving-picture data is an intra-frame-encoded frame having been encoded without depending on another frame of moving-picture data or an inter-frame-encoded frame having been encoded depending on another frame of moving-picture data;

deciphering means for deciphering, in accordance with an algorithm which is the reverse of a relevant enciphering algorithm, the frame of moving-picture data which was determined by the determining means as being the intra-frame-encoded frame; and outputting means for outputting deciphered moving-picture data including the frame of moving-picture data which was deciphered by the deciphering means and the frame of moving-picture data which was determined by the determining means as being the inter-frame-encoded frame.

In the above-described moving-picture encipherment method and system, in order to ensure determination as to whether each frame is an intra-frame encoded frame or an inter-frame encoded frame, step c) performs the determination for each encoded frame of moving-picture data using information which was previously provided in the frame of moving-picture data and indicates whether the frame was encoded in step a) or in step b).

Further, in above-described the moving-picture decipherment method and system, similar to the moving-picture encipherment method and system, in order to ensure determination as to whether each frame is an intra-frame encoded frame or an inter-frame encoded frame, step a) performs the determination for each frame of enciphered moving-picture data using information which was provided in the frame of enciphered moving-picture data and indicates whether the frame is the intra-frame-encoded frame or inter-frame-encoded frame.

Further, in the above-described moving-picture decipherment method and system, in order to enable easy determination as to whether each frame is an intra-frame encoded frame or an inter-frame encoded frame, step c) perform the determination for each encoded frame of moving-picture data using an elapsed time since each frame of moving-picture data was encoded either in step a) or in step b).

In order to enable easy decipherment of variable-length enciphered moving-picture data, in the above-described moving-picture encipherment method and system, a further step of f) adding length information, indicating a data length of the enciphered moving-picture data, to the enciphered moving-picture data.

In the moving-picture decipherment method and system for deciphering the enciphered moving-picture data having the length information added thereto, the data length of moving-picture data which was enciphered is determined using the length information.

In order to easily obtain the length information, said length information is obtained as a result of counting the number of bytes of the enciphered moving-picture data is counted.

In the above-described moving-picture encipherment method, in order to enable easy encipherment and decipherment, step d) performs the encipherment in a predetermined algorithm on part of the frame of moving-picture data which was determined in step c) as being the frame encoded in step a).

The moving-picture encipherment system for enciphering in accordance with the above-described method, further comprises extracting means for a extracting part to be enciphered from the frame of moving-picture data having been encoded by the first encoding means, said enciphering means performing the encipherment by a predetermined algorithm on the part of the frame of moving-picture data.

Further, the moving-picture decipherment method and system for deciphering the enciphered moving-picture data which includes data which was obtained as a result of enciphering part of the moving-picture data in the intra-frame-encoded frame in accordance with the predetermined algorithm, part of moving-picture data in the intra-frame-encoded frame is extracted, and the extracted part is deciphered.

In order to provide a moving-picture encipherment method and system for simplify a relevant decipherment in particular, moving-picture data in a frame is encoded without depending on another frame of moving-picture data, namely intra-frame encoding;

moving-picture data in a frame is encoded depending on another frame of moving-picture data, namely inter-frame encoding;

the encoded plurality of frames of moving-picture data are divided into data blocks, each having a predetermined data length;

whether or not each data block includes a predetermined part of the frame which was intra-frame encoded is determined;

in accordance with a predetermined algorithm, moving-picture data of the data block which was thus determined as including a predetermined part of the frame which was intra-encoded is enciphered;

enciphered moving-picture data comprising the data block of moving-picture data which was thus enciphered and the data block of moving-picture data which has not been enciphered is provided.

A moving-picture data encipherment system for enciphering in accordance with this method comprises:

first encoding means for encoding moving-picture data in a frame, without depending on another frame of moving-picture data;

second encoding means for encoding moving-picture data in a frame, depending on another frame of moving-picture data;

dividing means for dividing the encoded plurality of frames of moving-picture data into data blocks, each having a predetermined data length;

determining means for determining whether or not each data block includes a predetermined part of the frame which was encoded by the first encoding means;

enciphering means for enciphering, in accordance with a predetermined algorithm, moving-picture data of the data block which was determined by the determining means as including a predetermined part of the frame which was encoded by the first encoding means;

outputting means for outputting enciphered moving-picture data comprising the data block of moving-picture data which was enciphered by the enciphering means and the data block of moving-picture data which has not been enciphered.

Thus, also in this case, part of a plurality of frames of moving-picture data is enciphered.

A moving-picture data decipherment method for deciphering the enciphered moving-picture data comprises steps of:

a) determining whether or not each data block of enciphered moving-picture data includes enciphered moving-picture data;

b) deciphering, in accordance with an algorithm which is the reverse of a relevant enciphering algorithm, the data block of moving-picture data which was determined in step a) as including enciphered moving-picture data; and c) producing deciphered moving-picture data comprising the data block of moving-picture data which was deciphered in step b) and the other data blocks of moving-picture data.

A moving-picture data decipherment system for deciphering the enciphered moving-picture data in accordance with this method comprises:

determining means for determining whether or not each data block of enciphered moving-picture data includes enciphered moving-picture data;

deciphering means for deciphering, in accordance with an algorithm which is the reverse of a relevant enciphering algorithm, the data block of moving-picture data which was determined by the determining means as including enciphered moving-picture data; and outputting means for outputting deciphered moving-picture data comprising the data block of moving-picture data which was deciphered by the deciphering means and the other data blocks of moving-picture data.

In the above-described moving-picture encipherment method and system, in order to further enable easy decipherment of the enciphered moving-picture data, determination information is added to the enciphered moving-picture data, the determination information indicating a result of the determination performed for determining whether or not each data block includes a predetermined part of the frame which was intra-encoded.

In the relevant moving-picture data decipherment method and system, when deciphering the enciphered moving-picture data in which each data block has determination information added thereto for indicating whether or not the data block includes a predetermined part of a frame of moving-picture data which was encoded without depending on another frame of moving-picture data, the determination is performed using the determination information.

Other objects and further features of the present invention will become more apparent from the following detailed description when read in conjunction with the accompanying drawings.

BRIEF DESCRIPTION OF THE DRAWINGS

FIG. 9 shows another construction of the encipherment module;

FIG. 10 shows another construction of the decipherment module;

FIGS. 14A, 14B, 14C and 14D illustrate a frame arrangement in accordance with the MPEG 1 and enciphered moving-picture data in accordance with another method.

DESCRIPTION OF PREFERRED EMBODIMENTS

An embodiment of the present invention will now be described with reference to the figures.

Figure 1:
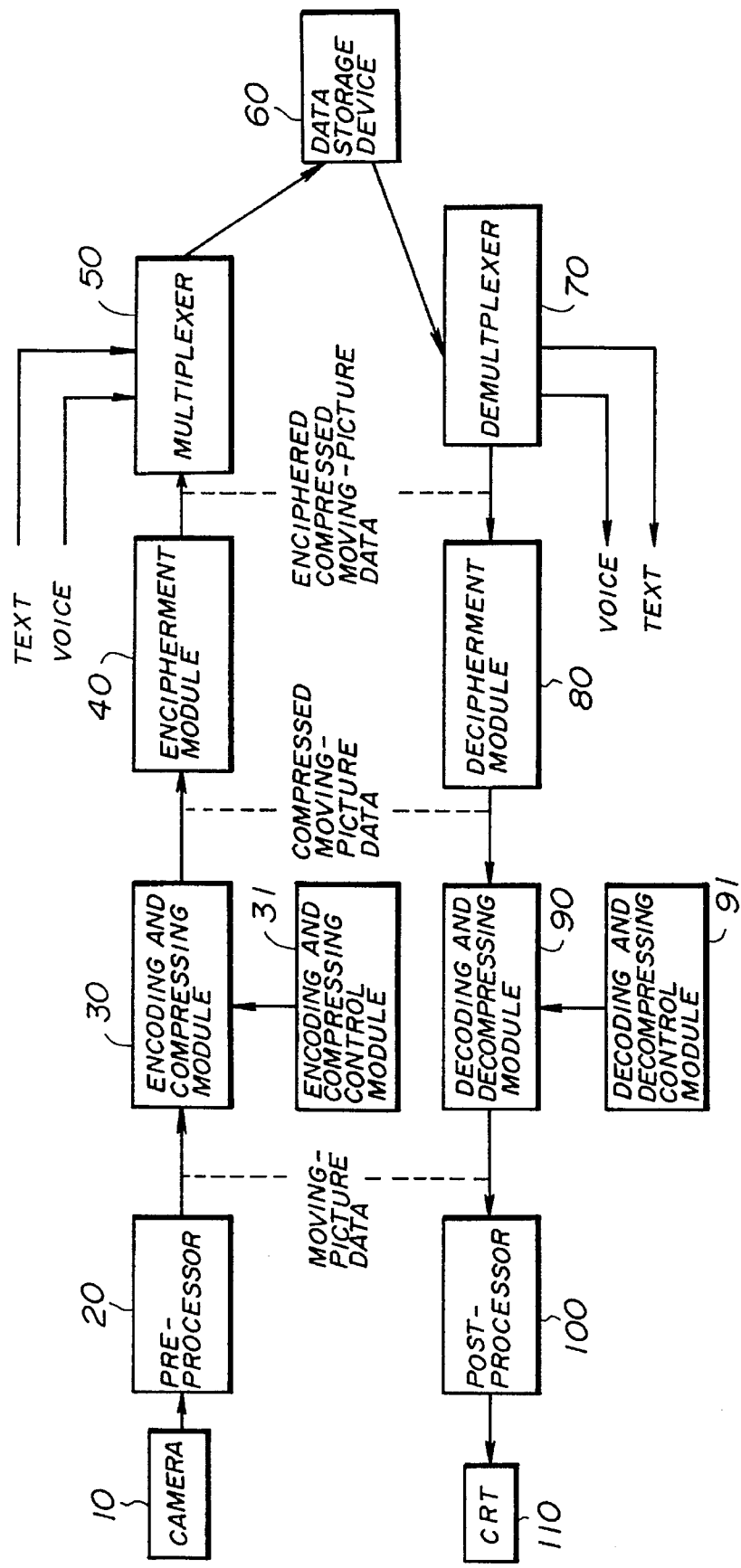
FIG. 1 shows a block diagram of a moving-picture recording system and reproducing system which applies the encipherment system and decipherment system according to the present invention.

FIG. 1 shows a general arrangement of a moving-picture recording system which uses an encipherment system according to the present invention and a moving-picture recording system which uses a decipherment system according to the present invention. As shown in the figure, the moving-picture data recording system includes a television camera 10, a pre-processor 20, an encoding and compressing module 30, an encoding and compressing control module 31, an encipherment module 40, and a multiplexer 50.

In the moving-picture recording system, a video signal is provided from the television camera 10 and is converted by the pre-processor 20 into frames of moving-picture data. The video signal includes a luminance signal Y and a color-difference signal Cr/Cb. The encoding and compressing module 30 encodes (compresses) the moving-picture data, for example in accordance with MPEG 1 (Moving Picture Expert Group 1) which is an international standard. (The MPEG 1 was produced by the MPEG (Moving Picture Expert Group), an expert group in the ISO/IEC JTC1/SC2/WG8.) The encoded (compressed) moving-picture data will be appropriately referred to as moving-picture data or compressed moving-picture data, hereinafter. The encoding and compressing control module 31 supplies to the encoding and compressing module 30 an encoding and compressing signal such as an intra-frame/inter-frame encoding signal or the like for controlling the encoding and compressing in accordance with the MPEG 1. A detailed construction of the encoding and compressing module 30 will be described later. Frames of compressed moving-picture data (moving-picture data) from the encoding and compressing module 30 is supplied to the encipherment module 40. The encipherment module 40 enciphers the compressed moving-picture data in accordance with a predetermined algorithm such as DES or the like. A detailed construction of the encipherment module 40 will be described later. The enciphered compressed moving picture data from the encipherment module 40 is supplied to the multiplexer 50 which multiplexes the enciphered compressed moving picture data with relevant voice data or text data. The multiplexed moving-picture data is supplied to a data storage device 60 such as a CD-ROM or the like which stores the supplied data.

The moving-picture reproducing system includes a demultiplexer 70, a deciphering module 80, a decoding and decompressing module 90, a decoding and decompressing control module 91, a post-processor 100 and a display unit 110 such as a CRT. The multiplexed data reproduced from the data storage device 60 is demultiplexed by the demultiplexer 70 to the enciphered compressed moving-picture data, voice data or text data. The deciphering module 80, in accordance with an algorithm which is the reverse of the above-mentioned encipherment algorithm, deciphers the enciphered compressed moving-picture data supplied from the demultiplexer 70. The resulting compressed moving-picture data is supplied to the decoding and decompressing module 90. The decoding and decompressing module 90, operating based on a control signal supplied from the decoding and decompressing control module 91, decodes the compressed moving-picture data in accordance with an algorithm which is the reverse of the above-mentioned MPEG1 coding algorithm. Thus, the moving-picture data is reproduced. The reproduced moving-picture data is converted into the video signal by the post-processor 100, and the moving picture represented by the video signal is displayed on the display unit 110.

A structure of the moving-picture data which has been encoded and thus compressed in accordance with the MPEG 1 by the encoding and compressing module 30 will now be described.

Figures 2A, 2B:
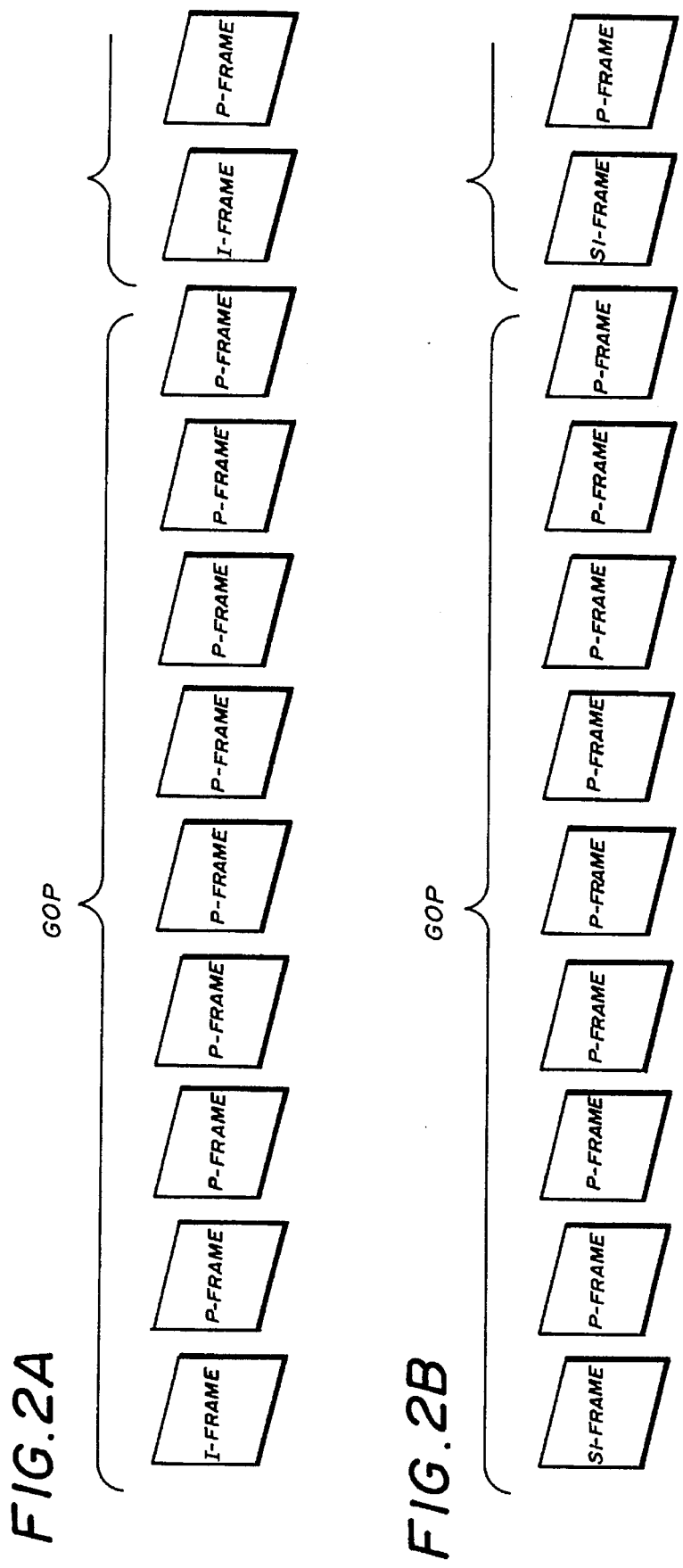
FIGS. 2A and 2B illustrate a frame arrangement of moving-picture data in accordance with MPEG 1 and a frame arrangement of moving-picture data enciphered in accordance with the present invention.

A plurality of frames constituting the moving picture are divided into groups (GOP: Groups of Picture). Each group includes I-frames (I-pictures: intra-pictures) and P-frames (P-pictures: Predictive-pictures). An I-frame is a frame of moving-picture data obtained as a result of encoding and thus compressing a frame of moving-picture data without depending on another frame of moving-picture data. Such encoding and thus compressing is referred to as intra-frame encoding. A P-frame is a frame of moving-picture data obtained as a result of encoding and thus compressing a frame of moving-picture data based on prediction from another frame of moving-picture data (a difference from the other frame of moving-picture data). Such encoding and thus compressing is referred to as inter-frame encoding. P-frames includes frames (narrow-sense frames), each resulting from encoding and thus compressing based on prediction from a preceding frame of moving-picture data (forward prediction), and frames (B-pictures: Bidirectional Predictive-pictures), each resulting from encoding and thus compressing based on prediction from preceding and subsequent frames of moving-picture data (bidirectional prediction). In each group (GOP), as shown in FIG. 2A, one I-frame and a plurality of P-frames are arranged. The encipherment module 40 detects the I-frame from the compressed (encoded) moving-picture data, and enciphers the I-frame of moving-picture data. As a result, the group has an arrangement in which the enciphered frame of moving-picture data (SI-frame) and the non-enciphered P-frames of moving-picture data are arranged as shown in FIG. 2B. This group shown in FIG. 2B is output from the encipherment module 40 as the enciphered compressed moving-picture data.

Figure 3:
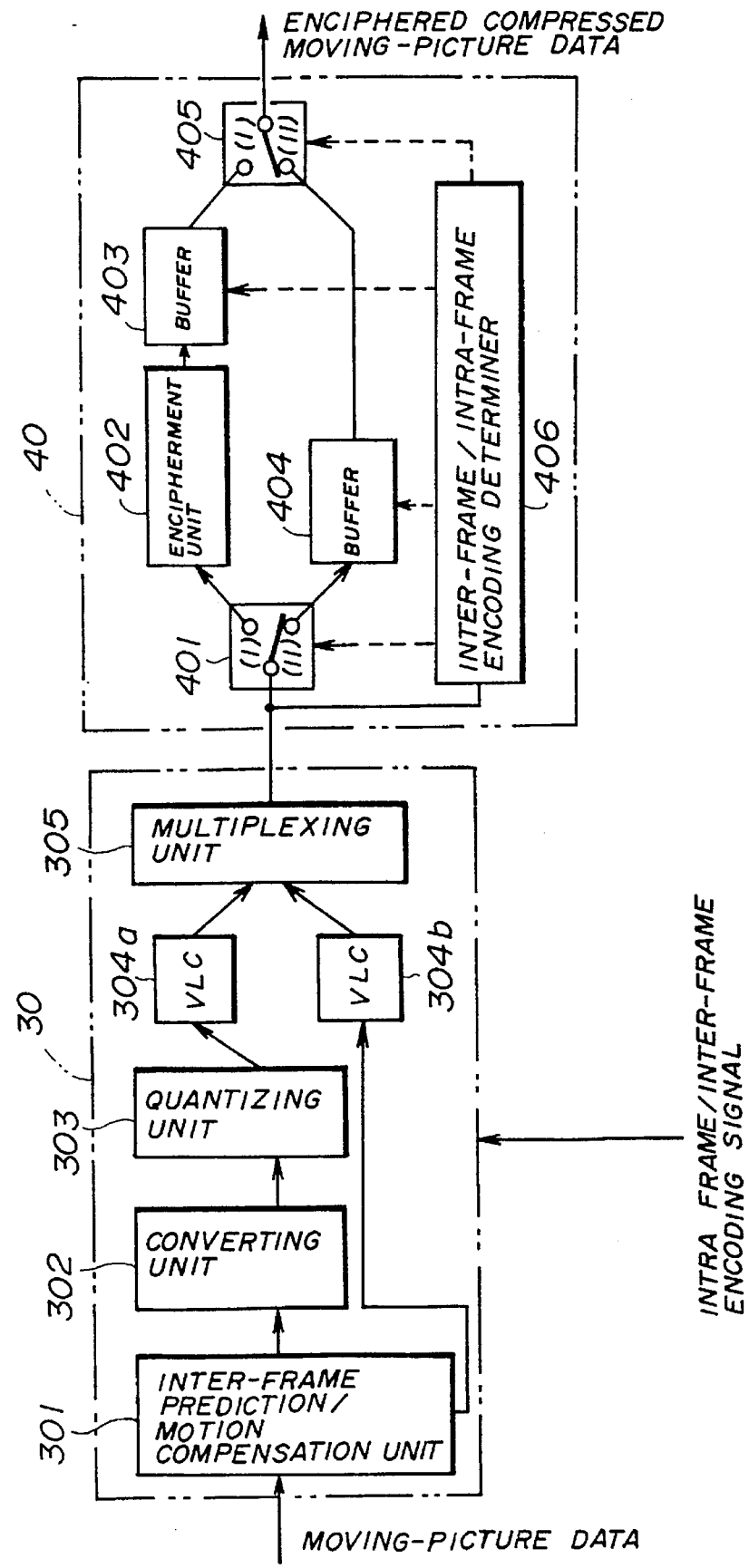
FIG. 3 shows a block diagram of an encoding and compressing module and an encipherment module shown in FIG. 1.

The above-mentioned encoding and compressing module 30 and encipherment module 40 in the moving-pictur data recording system has, for example, a construction shown in FIG. 3.

As shown in FIG. 3, the encoding and compressing module 30 includes an inter-frame prediction/motion compensation unit 301, a converting unit 302, a quantizing unit 303, a first variable-length coder (VLC) 304a, a second variable-length coder 304b, and a multiplexing unit 305.

The inter-frame prediction/motion compensation unit 301 is controlled based on the intra-frame/inter-frame encoding signal supplied from the encoding and compressing control module 31. The intra-frame/inter-frame encoding signal may be at a state (for example, a high level) indicating the intra-frame encoding and at a state (for example, a low level) indicating the inter-frame encoding. When performing the intra-frame encoding of moving-picture data, the intra-frame/inter-frame encoding signal is at the state indicating the intra-frame encoding. At this time, the inter-frame prediction/motion compensation unit 301 supplies input frames of moving-picture data as it is to the subsequent converting unit 302.

When performing the inter-frame encoding of moving-picture data, the intra-frame/inter-frame encoding signal is in the state indicating the inter-frame encoding. At this time, the inter-frame prediction/motion compensation unit 301 performs predetermined inter-frame prediction and motion compensation on input moving-picture data. The unit 301 supplies resulting moving-picture data to the converting unit 302.

The converting unit 302 performs a discrete cosine transformation (DCT) on the moving-picture data supplied from the inter-frame prediction/motion compensation unit 301. The transformation-performed moving-picture data is quantized through the quantizing unit 303, and then encoded by the first variable-length coder (VLC) 304a. Further, the inter-frame prediction/motion compensation unit 301 separates sub-information, such as movement vector-inforamtion included in each frame of moving-picture data, from the moving-picture data, and supplies the sub-information to the second variable-length coder (VLC) 304b. The second variable-length coder 304b encodes the sub-information. The moving-picture data encoded by the first variable-length coder (VLC) 304b and the sub-information encoded by the second variable-length coder (VLC) 304b are multiplexed by the multiplexer 305. Thus, each frame of moving-picture data (including the moving-picture data and sub-information) is formed.

Under control of the intra-frame/inter-frame encoding signal, the encoding and compressing module 30 outputs I-frames and P-frames of compressed moving-picture data in series as shown in FIG. 2A.

Figure 8A:
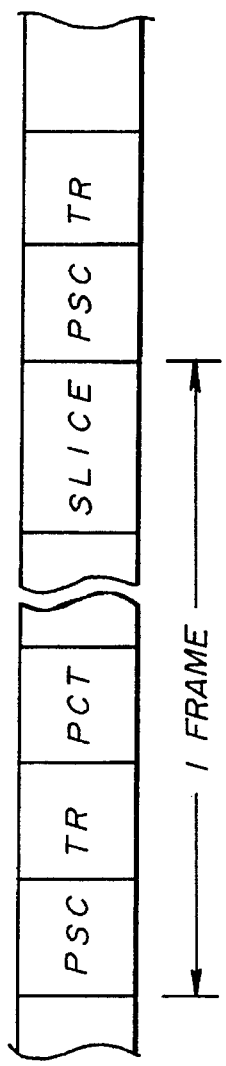
FIGS. 8A, 8B and 8C illustrate a format of a frame in accordance with the MPEG 1 and formats of enciphered frames.

Each frame of the compressed moving-picture data has a format such as, for example, that shown in FIG. 8A. That is, a start flag (PSC: Picture Start Code) indicating the starting of the frame is positioned at the top of each frame. Subsequently, a sequential number (TR: Temporal Reference) in a relevant GOP and a group of bits (PCT: Picture Coding Type) indicating a type (I-frame or P-frame) of a relevant picture are arranged. At the end of each frame, a slice layer (SLICE) including substantial compressed moving-picture data is positioned. Correspondence between the group of bits (PCT) and the type (encoded mode) will now be listed:

| GROUP OF BITS | ENCODED MODE |
| --- | --- |
| 001 | INTRA-ENCODING (INTRA-FRAME ENCODING) |
| 010 | FORWARD PREDICTIVE ENCODING |

| GROUP OF BITS | ENCODED MODE |
| --- | --- |
| 011 | (INTER-FRAME ENCODING) BIDIRECTIONAL PREDICTIVE ENCODING (INTER-FRAME ENCODING) |
| 100 | DC INTRA ENCODING (INTRA-FRAME ENCODING) |

Further, in FIG. 3, the encipherment module 40 includes a first switch unit 401, an encipherment unit 402, a first buffer 403, a second buffer 404, a second switch unit 405 and an inter-frame/intra-frame encoding determiner 406.

The inter-frame/intra-frame encoding determiner 406 performs frame-synchronization based on the start flag (PSC) of each frame in the compressed moving-picture data supplied from the encoding and compressing module 30. The determiner 406 then determines, based on the group of bits (PCT) subsequent to the start flag, whether each frame supplied by the encoding and compressing module 30 is a frame (PCT= 001 or 100) obtained as a result of performing the intra-frame encoding or a frame (PCT=010 or 011) obtained as a result of performing the inter-frame encoding (see the above-mentioned correspondence between the PCT and encoded modes). Based on a result of the determination, the inter-frame/intra-frame encoding determiner 406 supplies a switching signal to the first and second switch units 401 and 405, and at the same time supplies a timing signal to the first and second buffers 403 and 404.

A change-over switch in the first switch unit 401 is controlled based on the switching signal supplied from the inter-frame/intra-frame encoding determiner 406, so as to select a terminal (I) when receiving an I-frame of moving-picture data having undergone the intra-frame encoding, and to select a terminal (II) when receiving a P-frame of moving-picture data having undergone the inter-frame encoding. In the second buffer 404 connected to the terminal (II) of the first switch unit 401, storage and outputting of the P-frames of compressed moving-picture data having undergone the inter-frame encoding supplied via the terminal (II) is controlled based on the timing signal supplied from the inter-frame/intra-frame encoding determiner 406.

The encipherment unit 402 connected to the terminal (I) of the first switch unit 401 performs synchronization based on the start bit (PSC) of an I-frame having undergone the intra-frame encoding supplied via the terminal (I). Then, the encipherment unit 402 enciphers the slice layer (SLICE) of the compressed moving-picture data in accordance with a predetermined algorithm (for example, the DES). The enciphered compressed moving-picture data is temporarily stored in the first buffer 403, which operates based on the timing signal supplied from the inter-frame/intra-frame encoding determiner 406, and output from the first buffer 403 in a predetermined timing. The enciphered I-frames of compressed moving-picture is suppled from the first buffer 403 to a terminal (II) of the second switch unit 405. The P-frames of compressed moving-picture is suppled from the second buffer 404 to a terminal (II) of the second switch unit 405.

A change-over switch in the second switch unit 405 is controlled based on the switching signal from the inter-frame/intra-frame encoding determiner 406, so as to select the terminal (I) when the enciphered compressed moving-picture data has been stored in the first buffer 403, and to select the terminal (II) when output of the enciphered compressed moving-picture data from the first buffer 403 has been completed.

The encipherment module 40, as described above, performs the determination as to whether a relevant frame of moving-picture data is an I-frame having undergone the intra-frame encoding or a P-frame having undergone the inter-frame encoding through the determiner 406. The module 40, based on a determination result, the first switch unit 401, second switch unit 405, first buffer 403 and second buffer 404 are controlled. As a result, SI-frames of moving-picture data including moving-picture data (enciphered compressed moving-picture data) having undergone the intra-frame encoding and encipherment, and P-frames of moving-picture data having undergone the inter-frame encoding are arranged as shown in FIG. 2, and then output from the second switch unit 405 as enciphered moving-picture data.

Figure 8B:
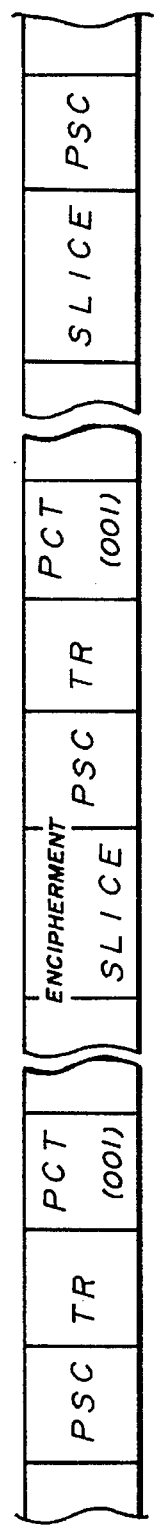

Each of the above-mentioned SI-frames including the enciphered compressed moving-picture data has a format shown in FIG. 8B. That is, the start flag (PSC), the group (GOP) sequential number (TR), and the group of bits (PCT=001) indicating a relevant encoded mode are arranged in series. At the end thereof, the slice layer (SLICE) including the enciphered compressed moving-picture data is positioned, which data is variable-length data.

In the above-described encipherment, not all the frames but only frames having undergone the intra-frame encoding are enciphered. Therefore, the data amount of moving-picture data to be enciphered is reduced. As a result, even if an encipherment algorithm is complicated, a relatively short time is required for the encipherment of the moving-picture data. Further, in a case where the enciphered SI-frame of moving-picture data has not been correctly deciphered, it is not possible to obtain a correct one of the I-frame of moving-picture data even if the deciphered moving-picture data is decoded. Further, even if a first P-frame of moving-picture data, which was encoded using prediction (difference) obtained from that I-frame of moving-picture data, is decoded using that prediction (difference), a correct one of the first P-frame of moving-picture cannot be obtained. Similarly, another P-frame of moving-picture data, which was encoded using prediction (difference) obtained from the first P-frame of moving-picture data cannot be correctly decoded. As a result, correctly decoded moving-picture data cannot be obtained for every frame of moving-picture data. Thus, although only partial frames (I-frames) of compressed moving-picture data are enciphered, the effect of this encipherment has influence over all the frames (including P-frames) of moving-picture data. As a result, the safety generally expected from an applied encipherment algorithm can be sufficiently achieved.

The above-described moving-picture data reproduction system reproduces the thus-enciphered compressed moving-picture data from the data storage device 60. The decipherment module 80 and decoding and decompressing module 90 in this reproduction system has a construction as shown in FIG. 5.

Figure 5:
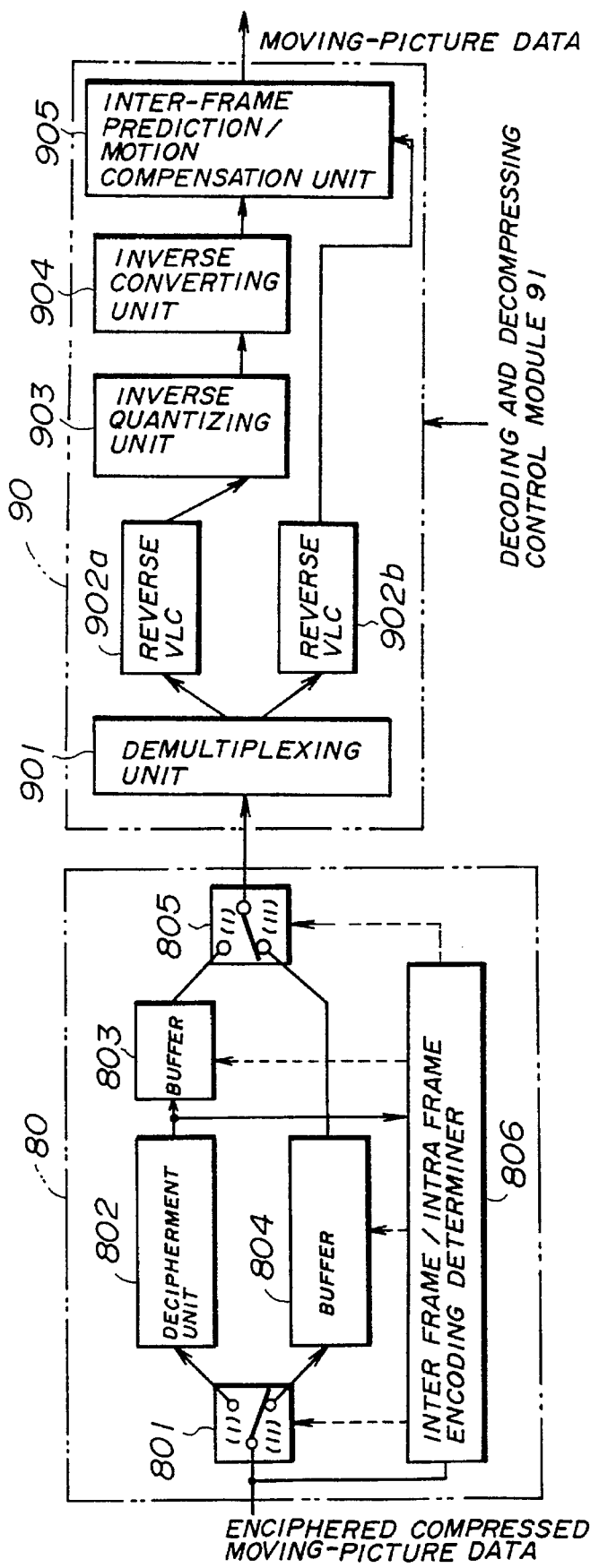
FIG. 5 shows a block diagram of a decoding and decompressing module and a decipherment module shown in FIG. 1.

As shown in FIG. 5, the decipherment module 80 includes a first switch unit 801, a decipherment unit 802, a first buffer 803, a second buffer 804, a second switch unit 805 and an inter-frame/intra-frame encoding determiner 806.

The inter-frame/intra-frame encoding determiner 806 performs frame-synchronization based on the start flag (PSC) of each frame in the moving-picture data read from the data storage device 60 (see the formats shown in FIGS. 8A and 8B). The determiner 806 then determines, based on the group of bits (PCT) subsequent to the start flag, whether each read frame is a frame (SI-frame) having undergone the intra-frame encoding or a frame (P-frame) having undergone the inter-frame encoding (see the above-mentioned correspondence between the PCT and encoded modes). Based on a result of the determination, the inter-frame/intra-frame encoding determiner 806 supplies a switching signal to the first and second switch units 801 and 805, and at the same time supplies a timing signal to the first and second buffers 803 and 804.

The enciphered compressed moving-picture data included in the slice layer (SLICE) of the SI-frame having undergone the intra-frame encoding has a variable-length format. Therefore, in order to detect the start flag (PSC) of a subsequent frame, it is necessary to check the moving-picture data in the slice layer (SLICE). Therefore, as will be described later, when the decipherment unit 802 deciphers the enciphered compressed moving-picture data in the slice layer (SLICE), the inter-frame/intra-frame encoding determiner 806 checks an output of the decipherment unit 802 and then detects the start flag (PSC) of the subsequent frame.

When the frame of compressed moving-picture data having undergone the inter-frame encoding is input, the inter-frame/intra-frame encoding determiner 806, through the switching signal, causes the first switch unit 801 to select a terminal (II). As a result, the P-frame of compressed moving-picture data having undergone the inter-frame encoding is stored in the second buffer 804 via the terminal (II). When the enciphered compressed moving-picture data is input, the inter-frame/intra-frame encoding determiner 806, through the switching signal, causes the first switch unit 801 to select a terminal (I). As a result, the enciphered SI-frame of compressed moving-picture data having undergone the intra-frame encoding is supplied to the decipherment unit 802 via the terminal (I). The decipherment unit 802 deciphers the moving-picture data in the slice layer (SLICE) in the frame. The decipherment is performed in accordance with an algorithm which is the of the encipherment algorithm used in the above-described encipherment unit 402 in the recording system. The moving-picture data in the I-frame including the moving-picture data (compressed moving-picture data) resulting from the decipherment in the slice layer is stored in the first buffer 803.

A change-over switch in the second switch unit 805 is controlled based on the switching signal from the inter-frame/intra-frame encoding determiner 806, so as to select the terminal (I) when the moving-picture data has been stored in the first buffer 803. At this time, based on the timing signal supplied from the inter-frame/intra-frame encoding determiner 806, the I-frame of compressed moving-picture data having undergone the intra-frame encoding is output from the second buffer 803. When the output of the moving-picture data from the first buffer 903 has been completed, the change-over switch in the second switch unit 805 is controlled based on the switching signal from the inter-frame/intra-frame encoding determiner 806, so as to select the terminal (II).

By the above-described operation of the decipherment module 80, the enciphered compressed moving-picture data reproduced from the data storage device 60 is deciphered. As a result, the compressed moving-picture data which was encoded in accordance with the above-described MPEG 1 and has the arrangement shown in FIG. 2A in each frame is output from the decipherment module 80.

Further, as shown in FIG. 5, the decoding and decompressing module 90 includes a demultiplexing unit 901, a first reverse variable-length coder 902a, a second reverse variable-length coder 902b, an inverse quantizing unit 903, an inverse converting unit 904, and an inter-frame/prediction/moving compensation unit 905. Based on the control signal supplied from the decoding and decompressing control module 91, decoding, which is a reverse of the encoding by the encoding and compressing module 30, is performed on the compressed moving-picture data and sub-information which have been demultiplexed by the demultiplexing unit 901.

The above-described reproduction system selectively deciphers only the enciphered SI-frames of compressed moving-picture data. As a result, the compressed moving-picture data in a state (shown in FIG. 2A) having undergone the MPEG 1 encoding is obtained. This compressed moving-picture data is then decompressed and thus the original moving-picture data is obtained.

Another construction of the encipherment module 40 in the above-mentioned recording system will now be described with reference to FIG. 4. In the figure, the same reference numerals are given to components having functions the same as those of corresponding components shown in FIG. 3.

Figure 4:
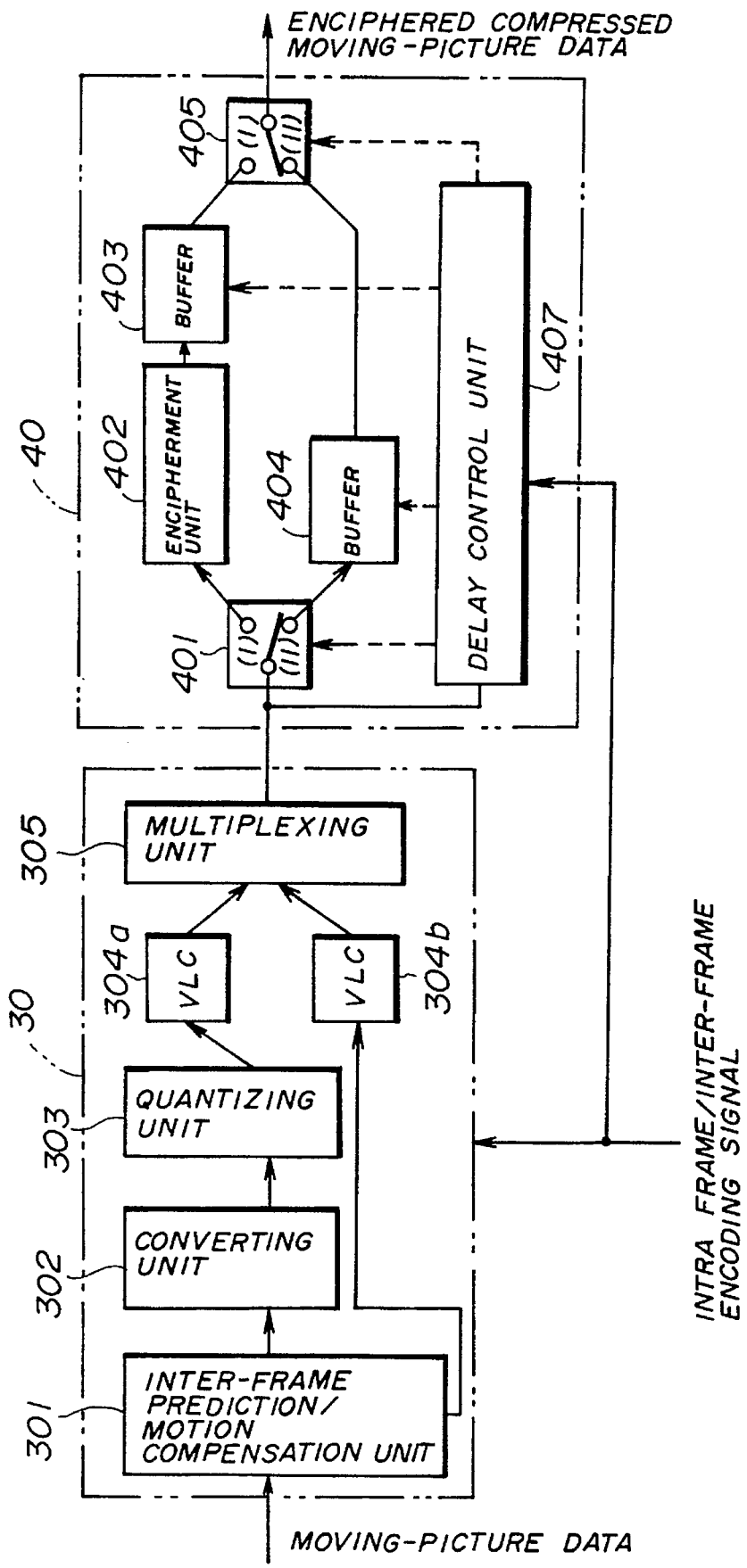
FIG. 4 shows a block diagram of the encoding and compressing module and another construction of the encipherment module.

In the construction shown in FIG. 4, a delay control unit 407 is provided instead of the inter-frame/intra-frame encoding determiner 406 shown in FIG. 3. The delay control unit 407 delays the intra-frame/inter-frame encoding signal, which is used for encoding in the encoding and compressing module 30, according to a relevant processing time. The delay control unit 407 thus produces the switching signal for the first and second switch units 401, 405 and the timing signal for the first and second buffers 403 and 404.

Thereby, it is not necessary to perform frame-synchronization using a bit series in the compressed moving-picture data which was performed by the inter-frame/intra-frame encoding determiner 406. As a result, it is possible to simplify the construction of the encipherment module 40.

Another construction of the encipherment module 40 in the above-mentioned recording system will now be described with reference to FIG. 6. In the figure, the same reference numerals are given to components having functions the same as those of corresponding components shown in FIG. 3.

Figure 6:
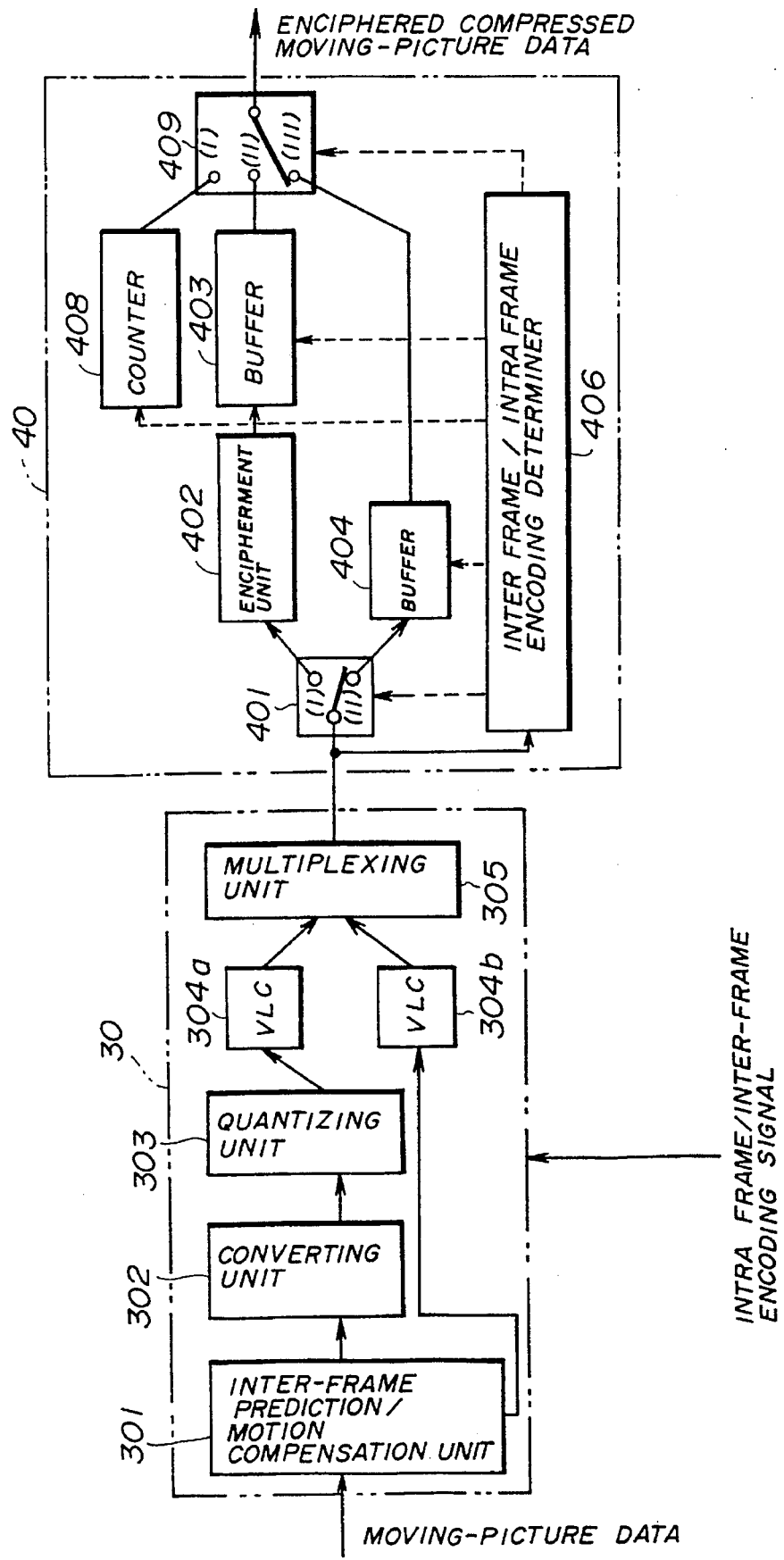
FIG. 6 shows a block diagram of the encoding and compressing module and another construction of the encipherment module.

In the construction shown in FIG. 6, a counter 408 is added in the encipherment module 40, and a switch unit 409 for selecting one of the outputs of the counter 408, the first and second buffers 403 and 404 are provided instead of the second switch unit 405 for selecting one of outputs of the first and second buffers 403 and 404.

Figure 8C:
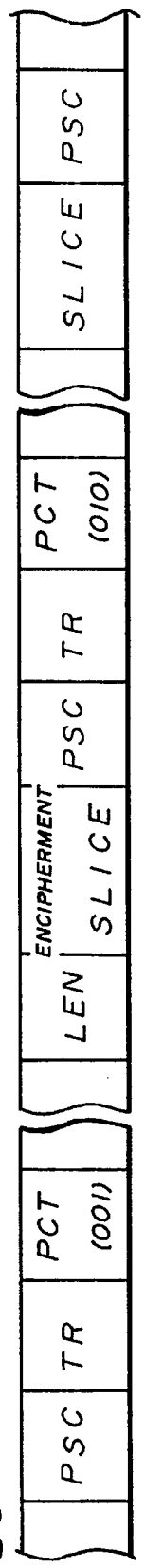

The counter 408 measures a data length of the moving-picture data enciphered by the encipherment unit 402. The switch unit 409, based on the switching signal supplied by the inter-frame/intra-frame encoding determiner 406, selects a terminal (I) before the enciphered compressed moving-picture data in the first buffer 403 connected to a terminal (II) is output. Thus, the switch unit 409 outputs a count number indicating the data length of the enciphered moving-picture data, the count number being thus output from the encipherment module 40. As a result, a format of the moving-picture data output from the encipherment module 40 includes a LEN field which stores the data length of the enciphered moving-picture data of the slice layer (SLICE) before the slice layer which includes the enciphered compressed moving-picture data, as shown in FIG. 8C.

The reproducing system will now be described, which is used for reproducing data from the data storage device 60 which stores the data in the recording system which includes the encipherment module 40 having the above-described construction shown in FIG. 6. The reproducing system include the decipherment module 80 such as that, for example, shown in FIG. 7. In the figure, the same reference numerals are given to components having functions the same as those of corresponding components shown in FIG. 5.

Figure 7:
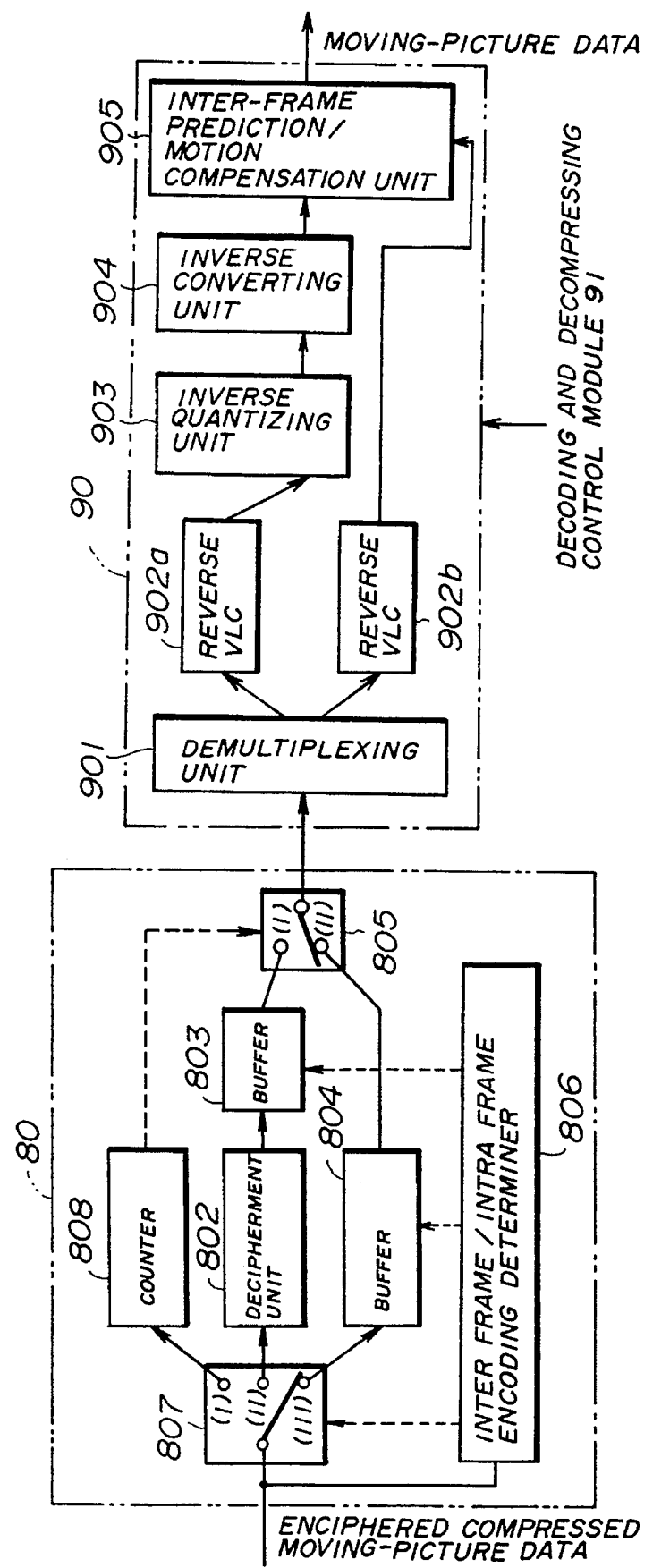
FIG. 7 shows a block diagram of the decoding and decompressing module and another construction of the decipherment module.

In the construction shown in FIG. 7, a counter 808 is added in the decipherment module 80 shown in FIG. 5, and a switch unit 807 for selecting one of the outputs of the counter 808, the decipherment unit 802 and second buffer 804 is provided instead the first switch unit 801 for selecting one of the outputs of the decipherment unit 802 and second buffer 804.

The inter-frame/intra-frame encoding determiner 806 after determining, based on the group of bits (PCT) indicating encoding mode, that input moving-picture data is an enciphered frame (SI-frame) of moving-picture data, supplies a switching signal to the switch unit 807. The switching signal is a signal which causes the switch unit 807 to select a terminal (I) connected to the counter 808. Then, a number stored in the LEN field positioned at the front of the slice layer (SLICE) is set in the counter 808, which number indicates the data length of data in the slice layer. Then, the switch unit 807 is controlled to select a terminal (II), and thus the enciphered moving-picture data in the slice layer is deciphered by the decipherment unit 802. The deciphered moving-picture data is stored in the first buffer 803 in sequence. In this encipherment process, the set number of the counter 808 is decremented by '1' when each bit is processed. Then, when the number of the counter 808 reaches '0', the counter supplies a signal for controlling the second switch unit 805 which thus selects the terminal (I). As a result, an I-frame of compressed moving-picture data resulting from the decipherment is supplied to the decoding and decompressing module 90 from the first buffer 803 via the terminal (I) of the second switch unit 805. When the output of the moving-picture data which resulted from the decipherment and was stored in the first buffer 803 has been completed, the second switch unit 805 is controlled based on the switching signal supplied by the inter-frame/intra-frame encoding determiner 806 and thus selects the terminal (II). As a result, subsequently to the above-mentioned I-frame of compressed moving-picture data, a P-frame of compressed moving-picture data which was stored in the second buffer 804 is supplied to the decoding and decompressing module 90 via the terminal (II) of the second switch unit 805.

The LEN field which was added to the I-frame of compressed moving-picture data in the decipherment module 40 is deleted in the decipherment module 80 through a switching operation by the second switch unit 805.

By providing the encipherment module 40 in the recording system and decipherment module 80 in the reproducing system such as those described above, it is not necessary to monitor enciphered moving-picture data in the slice layer (SLICE) of an enciphered I-frame for detecting the start flag of a P-frame subsequent to this I-frame in the decipherment module 80. As a result, a process for controlling the second switch unit 805 in the decipherment module 80 can be simplified.

Other constructions of the encipherment module 40 in the recording system and the decipherment module 80 in the reproducing system will now be described with reference to FIGS. 9 and 10. In FIG. 9, the same reference numerals are given to components having functions the same as those of corresponding components shown in FIG. 3. In FIG. 10, the same reference numerals are given to components having functions the same as those of corresponding components shown in FIG. 5.

In the recording system, regularly only a fixed data length (N bytes) in the compressed moving-picture data in the slice layer (SLICE) in an intra-frame encoded I-frame is enciphered. In the reproducing system, the enciphered fixed length (N bytes) of moving-picture data in the slice layer (SLICE) in the I-frame is deciphered.

In the encipherment module 40, first and second counters 410 and 411 are added to the arrangement shown in FIG. 3.

In the encipherment module 40, the inter-frame/intra-frame encoding determiner 406 determined that an input frame of compressed moving-picture data is an intra-frame encoded I-frame, and detects the start of the slice layer of the I-frame. As a result, the inter-frame/intra-frame encoding determiner 406 supplies a start signal to the first counter 410. The first counter 410 start counting and thereby the first switch unit 401 is controlled to select the terminal (I). Thus, the compressed moving-picture data of the slice layer in the I-frame is supplied to the encipherment unit 402 via the terminal (I). When a count number of the first counter 410 has reached a count number corresponding to a processing amount for processing the N bytes of moving-picture data in the encipherment unit 402, the first switch unit 401 is controlled to select the terminal (II). In this time, the N bytes of compressed moving-picture data enciphered by the encipherment unit 402 is stored in the first buffer 403.

The inter-frame/intra-frame encoding determiner 406, when it is a time for outputting the moving-picture data of the slice layer in the I-frame, supplies a start signal to the second counter 411. As a result, the second counter 411 starts counting and the second switch unit 405 is controlled to select the terminal (I). The enciphered compressed moving-picture data stored in the first buffer 403 is then output via the terminal (I) of the second switch unit 405. When a count number of the second counter 411 has reached a count number corresponding to the N bytes of moving picture data, the second switch unit 405 is controlled to select the terminal (II). Then, the compressed moving-picture data supplied to the encipherment module 40 is output therefrom via the first switch unit 401, second buffer 404, and second switch unit 405.

By the above-described construction of the encipherment module 40, only N bytes of moving-picture data in the slice layer (SLICE) in an I-frame, which was intra-frame encoded, is enciphered.

In the decipherment module 80, first and second counters 809 and 810 are added to the arrangement shown in FIG. 5.

This decipherment module 80 performs an operation similar to that performed by the above-mentionied encipherment module 40. Specifically, the inter-frame/intra-frame encoding determiner 806 determined that an input frame of compressed moving-picture data is an I-frame, and detects the start of the slice layer of the I-frame. As a result, the inter-frame/intra-frame encoding determiner 806 supplies a start signal to the first counter 809. As a result, the first counter 809 start counting and thereby the first switch unit 801 is controlled to select the terminal (I). Thus, the enciphered compressed moving-picture data in the. I-frame is supplied to the decipherment unit 802 via the terminal (I). The decipherment unit 802 deciphers the supplied moving-picture data and the deciphered moving-picture data is stored in the first buffer 803. When a count number of the first counter 809 has reached a count number corresponding to a processing amount for processing the N bytes of moving-picture data in the encipherment unit 402, the first switch unit 801 is controlled to select the terminal (II).

Then, when it is a time for outputting the moving-picture data of the slice layer in the I-frame, the second counter 810 starts counting and the second switch unit 805 is controlled to select the terminal (I). As a result, the deciphered moving-picture data stored in the first buffer 803 is output via the terminal (I) of the second switch unit 805. When a count number of the second counter 810 has reached a count number corresponding to the N bytes of moving picture data, the second switch unit 805 is controlled to select the terminal (II). Then, the moving-picture data, which has not undergone the decipherment and has been stored in the second buffer 804 is output via the terminal (II) of the second switch unit 805.

By the above-described construction of the decipherment module 80, only the enciphered N bytes of moving-picture data in the slice layer in an I-frame is deciphered.

In the above-described constructions, a fixed data length of moving-picture data is enciphered and is then deciphered. Therefore, it is not necessary to change a frame format so as to add the LEN field indicating the data length of enciphered data as mentioned above. Therefore, it is possible to further simplify the encipherment and decipherment.

Figure 11:
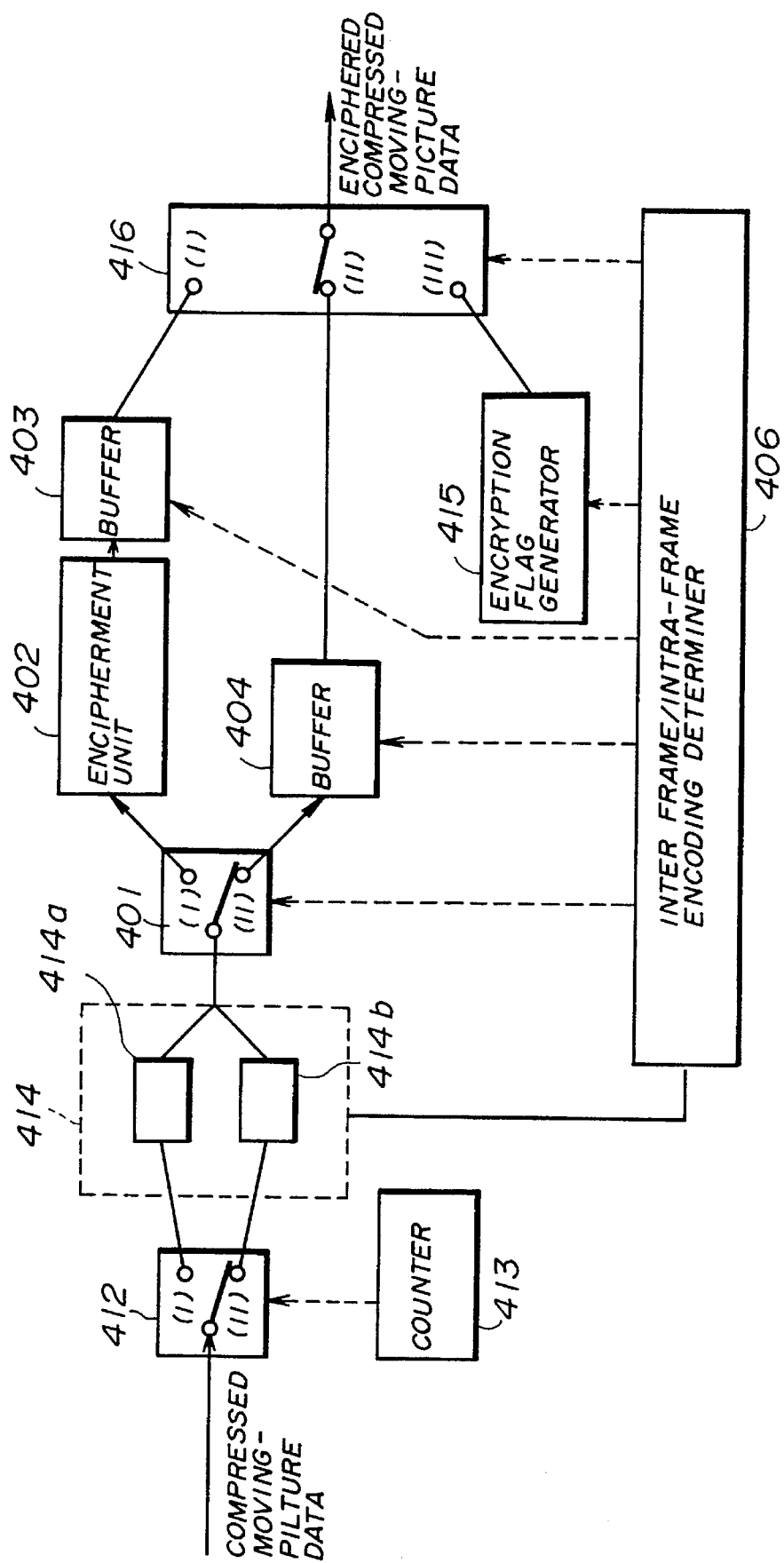
FIG. 11 shows another construction of the encipherment module.
Figure 12:
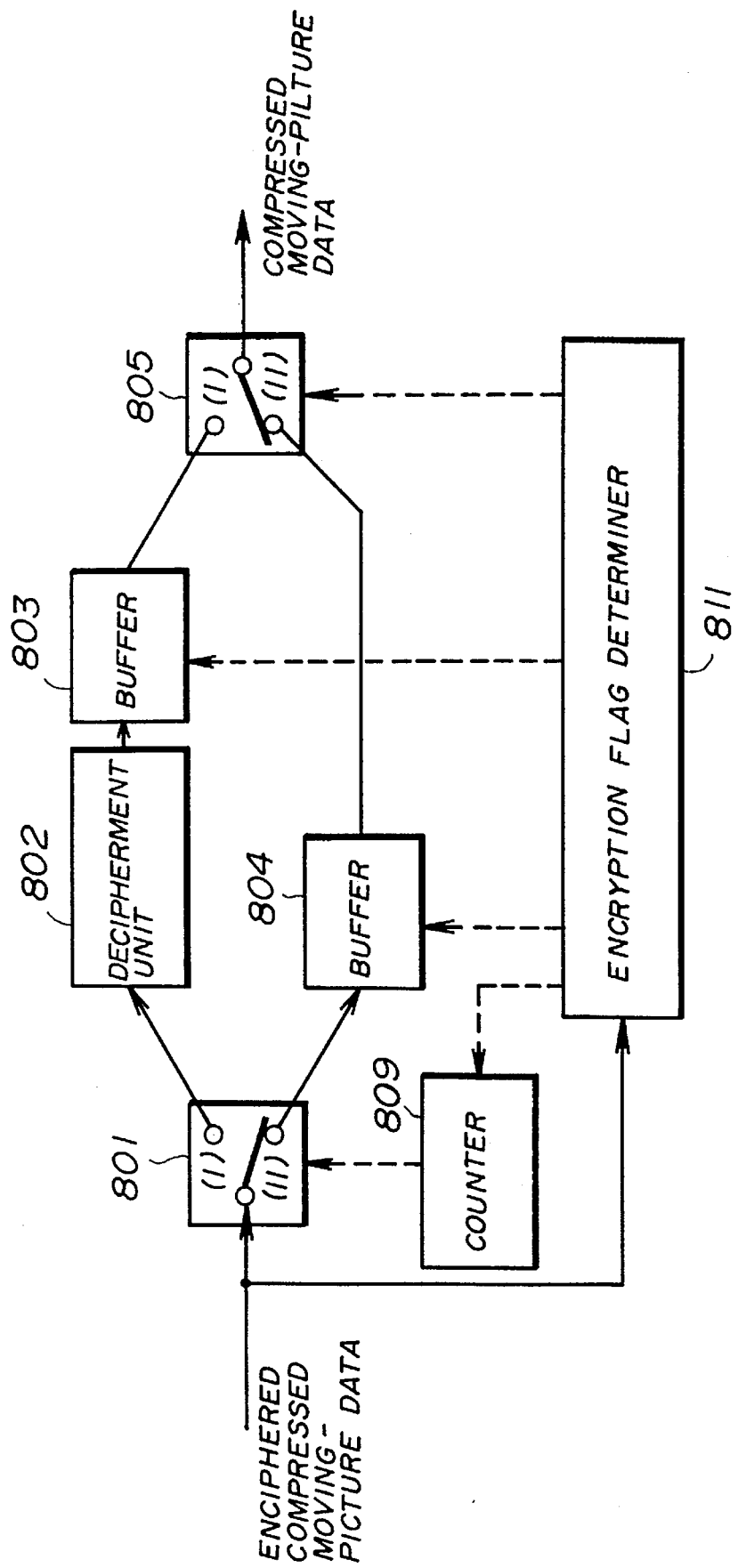
FIG. 12 shows another construction of the decipherment module.

Other constructions of the encipherment module 40 and decipherment module 80 will now be described with reference to FIGS. 11 and 12. In FIG. 11, the same reference numerals are given to components having functions the same as those of corresponding components shown in FIG. 3. In FIG. 12, the same reference numerals are given to components having functions the same as those of corresponding components shown in FIG. 5.

In the constructions, in the recording system, a plurality of frames of compressed moving-picture data are divided into fixed-length blocks, and among the blocks, only blocks each including a start portion of an intra-frame encoded I-frame are enciphered. Further, each block has an encryption flag added thereto for indicating whether or not the block is an enciphered block. In the reproduction system, when determining a block has the encryption flag indicating that the block is an enciphered block, the block is deciphered.

In the encipherment module 40 shown in FIG. 11, a third switch unit 412, a counter 413, a buffer unit 414 and an encryption flag generator 415 are added to the construction shown in FIG. 3, and a switch unit 416 is provided instead of the second switch unit 405.

Figures 13A, 13B:
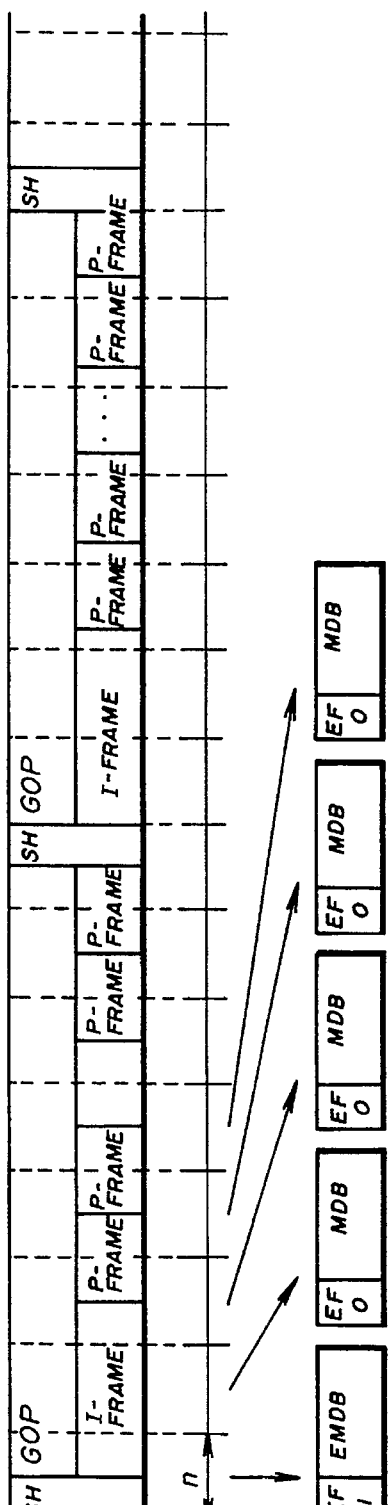
FIGS. 13A and 13B illustrate a frame arrangement in accordance with the MPEG 1 and enciphered moving-picture data.

A count number of the counter 413 is initialized to '0' each time reaching a count number corresponding to n bytes of data. At each time of the initialization in the counter 413, an effective output terminal in the third switch unit 412 is changed from terminals (I) to (II) or from (II) to (I). The buffer unit 414 includes buffers 414a and 414b, the buffer 414a is connected to the terminal (I) of the third switch unit 412, and the buffer 414b is connected to the terminal (II) thereof. When n bytes of compressed moving-picture data is stored in the buffer 414a via the terminal (I) of the third switch unit 412, initialization is performed in the counter 413 and thereby the effective output terminal of the third switch unit 412 is changed from the terminal (I) to the terminal (II). Thus, the compressed moving-picture data is stored in the buffer 412b via the terminal (II). During this storage, the compressed moving-picture data is output from the buffer 414a. When the output of the moving-picture data from the buffer 414a has been completed and a data amount stored in the buffer 414b has reached n bytes, initialization is performed in the counter 413 and thereby the effective output terminal of the third switch unit 412 is changed from the terminal (II) to the terminal (I). In this state, the compressed moving-picture data is output from the buffer 414b and simultaneously compressed moving-picture data is stored in the buffer 414a. These operations are repeated and as a result, the compressed moving-picture data having frames shown in FIG. 13A is divided into blocks, each block including n bytes. In FIG. 13A, each of sequence headers (SH) indicates a start position of each group (GOP).

The inter-frame/intra-frame encoding determiner 406 determined whether or not the group of bits (PCT=001) indicating that a relevant frame is an I-frame are included in the moving-picture data stored in the buffer 414a, 414b in the buffer unit 414. If it is determined that the group of bits (PCT=001) are included in at least one of the buffers 414a and 414b, the inter-frame/intra-frame encoding determiner 406 supplies the switching signal to the first switch unit 401 so that the terminal (I) is selected as the effective output terminal. Thereby, a data block including that group of bits (PCT=001) is output from the relevant buffer.

As a result, the compressed moving-picture data in the data block including the group of bits (PCT=001) indicating that a relevant frame is an I-frame is supplied to the encipherment unit 402 which enciphers the supplied data. The enciphered compressed moving-picture data is stored in the first buffer 403. At the time at which encipherment of the n bytes of data block has been completed, the inter-frame/intra-frame encoding determiner 406 supplies the switching signal to the first switch unit 401 and switch unit 416 so that the terminal (II) of the first switch unit 401 is selected as the effective output terminal and the terminal (III) of the switch unit 416 is selected as the effective input terminal. In this state, the encryption flag generator 415 outputs an encryption flag EF having a state '1' indicating that encipherment is performed. Then, the switch unit 416 is controlled to select the terminal (I) as the effective input terminal, via which the enciphered data block stored in the first buffer 403 is output.

If the group of bits (PCT=001), indicating that a relevant frame is an I-frame, are not included in data blocks stored in either one of the buffer 414a and 414b, the effective output terminal of the first switch unit 401 is fixed to be the terminal (II), via which each data block is stored in the second buffer 404 without being enciphered. The encryption flag generator 415 is kept in a state of outputting the encryption flag having a state '0' indicating a state that encipherment is not performed, and the switch unit 416 is controlled to selects the terminals (III) and (II) alternately when each data block is output.

By the above-described construction of the encipherment module 40, the encipherment module 40 outputs the enciphered data block EMDB (Encrypted MPEG Data Block) having the '1' encryption flag added thereto indicating that it has been enciphered, and the data block MDB (MPEG Data Block) having the '0' encryption flag added thereto indicating that it has not been enciphered, successively as shown in FIG. 13B.

In the decipherment module 80 shown in FIG. 12, a counter 809 is added to the construction shown in FIG. 5, and an encryption flag determiner 811 is provided instead of the inter-frame/intra-frame encoding determiner 806.

The data blocks each having the encryption flag EF added thereto are input to the decipherment module 80 successively with the arrangement shown in FIG. 13B. The encryption flag determiner 811 determines a state of the encryption flag EF added to the top of each block. When determining the state of the encryption flag EF as being '1' indicating that it was enciphered, the encryption flag determiner 811 supplies a start signal to the counter 809 and thus the counter 809 starts counting. Further, the start signal causes the first switch unit 801 to select the terminal (I) as the effective output terminal. As a result, the enciphered data block (EMDB) including the group of bits (PCT=001) indicating that a relevant frame is an I-frame is supplied to the decipherment unit 802 via the terminal (I) of the first switch unit 801. As a result, the deciphered n bytes of data block is stored in the first buffer 803.

When a count number of the counter 809 has reached a number corresponding to a processing amount for processing the n bytes of moving-picture data, the first switch unit 801 is controlled to select the terminal (II) as the effective output terminal. Simultaneously, the second switch unit 805 is controlled to select the terminal (I) as the effective input terminal, and thus the moving-picture data stored in the first buffer 803 is output. Then, the non-enciphered data blocks (MDB) are successively stored in the second buffer 804 via the terminal (II) of the second switch unit 801.

Then, when outputting of the n bytes of data block stored in the first buffer 803 has been completed, the second switch unit 805 is controlled to select the terminal (II), and thus the non-enciphered data blocks stored in the second buffer 804 are output. Thus, based on a state of the encryption flag EF which was added to each data block in the encipherment module 40, the first and second switch units 801 and 805 are controlled. Thereby, the enciphered data block is deciphered and the data blocks are appropriately linked with one another. As a result, the compressed moving-picture data having the data format shown in FIG. 13A is reproduced.

By the above-described constructions, processing is performed for each data block having the fixed data length (n bytes) regularly, and further the encryption flag EF is added to each data block for indicating whether or not the data block has been enciphered. Therefore, decipherment can be performed without specially checking the I-frame and P-frame. Thus, decipherment can be easily performed. Further a part of an I-frame of the moving-picture data is necessarily enciphered. When this frame of moving-picture data cannot be correctly deciphered, the effect thereof has an influence over other frames. As a result, a security level expected form an applied encipherment algorithm can be sufficiently achieved.

Further, it is also possible to store a respective encryption flag separately from each data block in the data storage device 60.

In this case, the encipherment module 40 in the recording system being similar to the above-described case, the frames comprised of moving-picture data shown in FIG. 14A are divided into data blocks each including n bytes. Each data block including the group of bits (PCT=001) indicating that a relevant frame is an I-frame is enciphered. Then, the enciphered data block EMDB and non-enciphered data blocks MDB are arranged without having added the encryption flags as shown in FIG. 14B. As shown in FIG. 14C, at the same time, the encryption flags EF supplied from the encryption flag generator 415 are also arranged so as to be relevant to the arranged data blocks. The arranged series of encryption flags form an encryption-flag map EFM and are stored in the data storage device 60 so that the encryption-flag map EFM is positioned at the front of the arranged data blocks of enciphered compressed moving-picture data as shown in FIG. 14D.

In the decipherment module 80 in the reproduction system, with reference to the encryption-flag map EFM read from the data storage device 60, the enciphered compressed moving-picture data is classified into the data blocks EMDB to be deciphered and the non-enciphered data block MDB. Based on a classification result, whether or not each data block is to be supplied to the decipherment unit and how each block is output is controlled.

Thereby, without altering the frame format of moving-picture data, decipherment of the enciphered compressed moving-picture data can be performed.

The present invention is not limited to the above-described embodiments in which the enciphered compressed moving-picture data is stored in a data storage device such as CD-ROM or the like, the moving-picture data being reproduced therefrom. The present invention can also be applied to a system in which the enciphered compressed moving-picture data is distributed to separate terminal units via a communication network.

Further, in an application of the present invention, the encoding algorithm is not limited to the MPEG 1, and any other encoding algorithm in which a frame encoded without depending on another frame of moving-picture data and a frame encoded depending on another frame of moving-picture data are combined can be used for the same purpose.

Further, in an application of the present invention, the encipherment algorithm is not limited to the DES, and any other encipherment algorithm can be used.

Thus, in the present invention, part of a plurality of frames of moving-picture data which have been encoded is enciphered. Therefore it is possible to reduce the time required for the encipherment. Further, moving-picture data which is to be enciphered is moving-picture data in a frame which has been encoded without depending on another frame of moving-picture data (intra-frame encoded). An effect of the encipherment is to influence moving-picture data in a frame which has been encoded depending on another frame of moving-picture data (inter-frame encoded). Therefore, although moving-picture data which is enciphered is only a part of the entirety of the moving-picture data, a security level equivalent to that expected from an applied encipherment algorithm can be achieved.

Thus, according to the present invention, it is possible to provide an encipherment method and system by which highly safe encipherment of moving-picture data can be easily achieved and, further, a decipherment method and system matching the encipherment method and system and, thus deciphering the enciphered moving-picture data.

Further, the present invention is not limited to the above-described embodiments, and variations and modifications may be made without departing from the scope of the present invention.

What is claimed is:

1. A moving-picture data encipherment method comprising steps of:

a) encoding moving-picture data in a frame, without depending on another frame of moving-picture data;

b) encoding moving-picture data in a frame, depending on another frame of moving-picture data;

c) determining whether each frame of moving-picture data was encoded in said step a) or in said step b);

d) enciphering the frame of moving-picture data which was determined in the step c) as being the frame encoded in said step a); and e) producing enciphered moving-picture data including the frame of moving-picture data which was enciphered in said step d) and the frame of moving-picture data which was determined in said step c) as being the frame which was encoded in said step b).

2. The moving-picture encipherment method according to claim 1, wherein said step c) determination is made for each encoded frame of moving-picture data using information previously provided in said frame of moving-picture data to indicate whether said frame was encoded in said step a) or in said step b).

3. The moving-picture encipherment method according to claim 1, wherein said step c) determination is made for each encoded frame of moving-picture data using a time which has elapsed since said each frame of moving-picture data was encoded in said step a) or in said step b).

4. The moving-picture encipherment method according to claim 1, further comprising a step of f) adding length information, indicating a data length of the enciphered moving-picture data, to said enciphered moving-picture data.

5. The moving-picture encipherment method according to claim 4, wherein said length information is obtained from counting a number of bytes of said enciphered moving-picture data.

6. The moving-picture encipherment method according to claim 1, wherein said step d) performs the encipherment by a predetermined algorithm on part of said frame of moving-picture data which was determined in said step c) as being the frame encoded in said step a).

7. The moving-picture encipherment method according to claim 6, wherein a data length of said part of said frame of moving-picture data to be enciphered in said step d) is a fixed length.

8. A moving-picture data encipherment method comprising steps of:

a) encoding moving-picture data in a frame, without depending on another frame of moving-picture data;

b) encoding moving-picture data in a frame, depending on another frame of moving-picture data;

c) dividing the encoded frames of moving-picture data into data blocks, each having a predetermined data length;

d) determining whether each data block includes a predetermined part of the frame which was encoded in said step a);

e) enciphering, in accordance with a predetermined algorithm, moving-picture data of the data block which was determined in said step d) as including a predetermined part of the frame which was encoded in said step a);

f) producing enciphered moving-picture data comprising the data block of moving-picture data which was enciphered in said step e) and a non-enciphered data block of moving-picture data.

9. The moving-picture encipherment method according to claim 8, further comprising a step of g) adding determination information to said enciphered moving-picture data, said determination information indicating a result of the determination performed in said step d).

10. The moving-picture encipherment method according to claim 9, wherein said step g) adds said determination information at a beginning of the data block.

11. A moving-picture data encipherment system comprising:

first encoding means for encoding moving-picture data in a frame, without depending on another frame of moving-picture data;

second encoding means for encoding moving-picture data in a frame, depending on another frame of moving-picture data;

determining means for determining whether each frame of moving-picture data is a frame which was encoded by said first encoding means or said second encoding means;

enciphering means for enciphering the frame of moving-picture data which was determined by said determining means as being the frame encoded by said first encoding means; and outputting means for outputting enciphered moving-picture data including the frame of moving-picture data which was enciphered by said enciphering means and the frame of moving-picture data which was determined by said determining means as being the frame which was encoded by said second encoding means.

12. The moving-picture encipherment system according to claim 11, wherein said determining means perform the determination for each encoded frame of moving-picture data using information previously provided in said frame of moving-picture data and indicates which encoding means of said first and second encoding means encoded said frame.

13. The moving-picture encipherment system according to claim 11, wherein said determining means performs the determination for each encoded frame of moving-picture data using a time which has elapsed since said each frame of moving-picture data was encoded by said one of said first and second encoding means.

14. The moving-picture encipherment system according to claim 11, further comprising adding means for adding length information, indicating a data length of the enciphered moving-picture data, to said enciphered moving-picture data.

15. The moving-picture encipherment system according to claim 14, further comprising counting means for counting a number of bytes of said enciphered moving-picture data, a result of the counting being used as said length information by said adding means.

16. The moving-picture encipherment system according to claim 11, further comprising extracting means for extracting a part to be enciphered from the frame of moving-picture data having been encoded by said first encoding means, said enciphering means performing the encipherment by a predetermined algorithm on said part of said frame of moving-picture data.

17. The moving-picture encipherment system according to claim 16, wherein said extracting means comprising:

counting means for counting a number of bytes of the moving-picture data being supplied to said enciphering means; and stopping means for stopping the supply of the moving-picture data to said enciphering means when a count number of said counting means has reached a predetermined number.

18. A moving-picture data encipherment system comprising:

first encoding means for encoding moving-picture data in a frame, without depending on another frame of moving-picture data;

second encoding means for encoding moving-picture data in a frame, depending on another frame of moving-picture data;

dividing means for dividing the encoded frames of moving-picture data into data blocks, each having a predetermined data length;

determining means for determining whether each data block includes a predetermined part of the frame which was encoded by said first encoding means;

enciphering means for enciphering, in accordance with a predetermined algorithm, moving-picture data of the data block which was determined by said determining means as including a predetermined part of the frame which was encoded by said first encoding means;

outputting means for outputting enciphered moving-picture data comprising the data block of moving-picture data which was enciphered by said enciphering means and the data block of moving-picture data which was non-enciphered.

19. The moving-picture encipherment system according to claim 18, further comprising adding means for adding determination information to said enciphered moving-picture data, said determination information indicating a result of the determination performed by said determining means.

20. The moving-picture encipherment system according to claim 19, wherein said adding means adds said determination information at a beginning of the data block.

21. A moving-picture data decipherment method for deciphering each frame of enciphered moving-picture data, which is enciphered in accordance with an enciphering algorithm, comprising the steps of:

a) determining whether said each frame of enciphered moving-picture data is an intra-frame-encoded frame having been encoded without depending on another frame of moving-picture data or an inter-frame-encoded frame having been encoded depending on another frame of moving-picture data;

b) deciphering, in accordance with an algorithm which is a reverse of the enciphering algorithm, the frame of moving-picture data which was determined in said step a) as being said intra-frame-encoded frame; and c) producing deciphered moving-picture data including the frame of moving-picture data which was deciphered in said step b) and the frame of moving-picture data which was determined in said step a) as being said inter-frame-encoded frame.

22. The moving-picture decipherment method according to claim 21, wherein said step a) performs the determination for said each frame of enciphered moving-picture data using information provided in said frame of enciphered moving-picture data and indicates whether said each frame is said intra-frame-encoded frame or said inter-frame-encoded frame.

23. The moving-picture decipherment method according to claim 21, wherein when deciphering the enciphered moving-picture data having length information added thereto for indicating a data length of moving-picture data which was enciphered, said data length of enciphered moving-picture data is determined using said length information.

24. The moving-picture decipherment method according to claim 21, wherein when deciphering the enciphered moving-picture data which includes data obtained as a result of enciphering part of the moving-picture data in said intra-frame-encoded frame in accordance with a predetermined algorithm, extracting said part of the moving-picture data in said intra-frame-encoded frame, and deciphering the extracted part.

25. A moving-picture data decipherment method for deciphering each data block of enciphered moving picture data, which is enciphered in accordance with an enciphering algorithm, comprising the steps of:

a) determining whether or not said each data block of enciphered moving-picture data includes enciphered moving-picture data;

b) deciphering, in accordance with an algorithm which is a reverse of the enciphering algorithm, the data block of moving-picture data determined in said step a) as including enciphered moving-picture data; and c) producing deciphered moving-picture data comprising the data block of moving-picture data which was deciphered in said step b) and other data blocks of moving-picture data.

26. The moving-picture data decipherment method according to claim 25, wherein when deciphering the enciphered moving-picture data in which said each data block has determination information added thereto for indicating whether said each data block includes a predetermined part of a frame of moving-picture data which was encoded independent of another frame of moving-picture data, the determination in said step a) being performed using said determination information.

27. A moving-picture data decipherment system for deciphering each frame of enciphered moving-picture data, which is enciphered in accordance with an enciphering algorithm, comprising:

determining means for determining whether said each frame of enciphered moving-picture data is the intra-frame-encoded frame having been encoded without depending on another frame of moving-picture data or an inter-frame-encoded frame having been encoded depending on another frame of moving-picture data;

deciphering means for deciphering, in accordance with an algorithm which is a reverse of an enciphering algorithm, the frame of moving-picture data which was determined by said determining means as being said intra-frame-encoded frame; and outputting means for outputting deciphered moving-picture data including the frame of moving-picture data which was deciphered by said deciphering means and the frame of moving-picture data which was determined by said determining means as being said inter-frame-encoded frame.

28. The moving-picture decipherment system according to claim 27, wherein said determining means performs the determination for said each frame of enciphered moving-picture data using information provided in said each frame of enciphered moving-picture data and indicates said each frame as being one of said intra-frame-encoded frame and inter-frame-encoded frame.

29. The moving-picture decipherment system according to claim 27, wherein when deciphering the enciphered moving-picture data having length information added thereto for indicating a data length of moving-picture data which was enciphered, said deciphering means deciphers a length of the enciphered moving-picture data, said length being determined based on said length information.

30. The moving-picture decipherment method according to claim 27, wherein when deciphering the enciphered moving-picture data which includes data obtained as a result of enciphering part of moving-picture data in said intra-frame-encoded frame in accordance with a predetermined algorithm, said deciphering means includes means for extracting said part of moving-picture data in said intra-frame-encoded frame, and deciphers the extracted part.

31. A moving-picture data decipherment system comprising:

determining means for determining whether each data block of enciphered moving-picture data includes enciphered moving-picture data;

deciphering means for deciphering, in accordance with an algorithm which is a reverse of an enciphering algorithm, the data block of moving-picture data which was determined by said determining means as including enciphered moving-picture data; and outputting means for outputting deciphered moving-picture data comprising the data block of moving-picture data which was deciphered by said deciphering means and the other data blocks of moving-picture data.

32. The moving-picture data decipherment system according to claim 31, wherein when deciphering the enciphered moving-picture data in which each data block has determination information added thereto for indicating whether said data block includes a predetermined part of a frame of moving-picture data encoded independent of another frame of moving-picture data, said determining means performs the determination using said determination information.

* * * * *

UNITED STATES PATENT AND TRADEMARK OFFICE
CERTIFICATE OF CORRECTION

PATENT NO. : 5,621,794
DATED : April 15, 1997
INVENTOR(S) : MATSUDA et al.

It is certified that error appears in the above-indentified patent and that said Letters Patent is hereby corrected as shown below:

TITLE PAGE: [56] References Cited, change the first U.S. Patent Document from "5,104,310 4/1992" to --5,014,310 5/1991--.

Signed and Sealed this

Twelfth Day of August, 1997

Attest:

BRUCE LEHMAN

Attesting Officer   Commissioner of Patents and Trademarks